United States Patent [19]
Shani

[11] Patent Number: 5,386,930
[45] Date of Patent: Feb. 7, 1995

[54] STORING AND DISPENSING DEVICE FOR GRANULAR FOODSTUFF, PARTICULARLY DOGFOOD

[76] Inventor: David Shani, 38, Keren Kayemet Street, Kiryat, Tivon, Israel

[21] Appl. No.: 88,248

[22] Filed: Jul. 7, 1993

[30] Foreign Application Priority Data

Jul. 15, 1992 [IL] Israel .................... 102515

[51] Int. Cl.$^6$ .............................................. B67D 5/06
[52] U.S. Cl. .................... 222/185; 222/434; 222/440; 222/448; 222/504
[58] Field of Search .............. 222/181, 185, 424.5, 222/425, 434, 438, 439, 440, 448, 460, 504

[56] References Cited

U.S. PATENT DOCUMENTS

| | | | |
|---|---|---|---|
| 2,588,206 | 3/1952 | Clark | 222/439 |
| 2,607,514 | 8/1952 | Keene, Jr. | 222/181 X |
| 2,852,170 | 9/1958 | Reynolds | 222/439 |
| 3,252,631 | 5/1966 | Sandifer | 222/439 |
| 3,344,958 | 10/1967 | Kaanehe | 222/181 |
| 3,602,400 | 8/1971 | Cooke | 222/185 |
| 3,834,593 | 9/1944 | James | 222/440 |
| 4,168,019 | 9/1979 | Hausam | 222/185 |
| 4,226,269 | 10/1980 | Carr et al. | 222/434 X |
| 4,792,068 | 12/1988 | Trygg | 222/504 X |

Primary Examiner—Andres Kashnikow
Assistant Examiner—Joseph A. Kaufman
Attorney, Agent, or Firm—Frishauf, Holtz, Goodman & Woodward

[57] ABSTRACT

A storing and dispensing device for dogfood and the like comprises a bin having a funnel-shaped bottom portion which terminates in a vertical channel with an open bottom end. A feeding mechanism is vertically movable in the channel, either manually of automatically, allowing a given amount of food to be emitted at each operation. The mechanism includes an upper valve which normally closes the bin, and a lower valve which normally keeps the channel bottom open, the two valves being connected by a shaft which permits their relative distance to be changed for different food portions. Lifting the upper valve opens the bin and lets food flow into the channel which is now closed by the lower valve, the food portion being defined by the space enclosed between the valves. After the space has been filled, the mechanism is lowered whereby the upper valve closes the bin and the lower valve lets the food run into a feeding bowl.

12 Claims, 4 Drawing Sheets

STORING AND DISPENSING DEVICE FOR GRANULAR FOODSTUFF, PARTICULARLY DOGFOOD

BACKGROUND OF THE INVENTION

The invention relates to a storage bin or container for holding granular foodstuff and containing a dispensing device suitable for drawing the same quantity of foodstuff every time this is required. The invention relates particularly to a storage bin for granular dogfood, wherein the dispensing device is adjustable for the amount of food required at every feeding time, depending on the size and the kind of dog to be fed.

The storing and dispensing device may be designed for any granular foodstuff to be used in kitchens, bakeries or other food industries, but in the following, for simplicity's sake, it will be referred to as a device for storing and dispensing granular dogfood or catfood.

In recent times it has been customary to buy ready-made food for household pets, such as cats, hunting dogs or watchdogs, thus saving time and trouble in cooking or otherwise preparing their meals. This food is brought in larger or smaller bags and stored in the kitchen or pantry from where each time the required quantity is taken out and poured into a plate or bowl. Not only does the bag constitute an obstacle, but the food is liable to be spoiled by humidity or water accidentally poured over it, or by vermin eating through the bag.

It is, therefore the object of the present invention to provide a well-closed storage bin which will keep the foodstuff dry and prevent rats, flies and other vermin from getting at it.

It is another object to include in the bin a dispersing unit which will deliver the same amount of food every time it is actuated, while permitting ready changing of the amount as soon as this is required.

It is another object to provide this device with an integrated bowl, obviating the provision of a separate feeding utensil which is usually in the way.

Still another object is to provide a device which will take up a relatively small floor space permitting its placing in the corner of a storage room, pantry or even the kitchen. On the other hand, it should be corrosion protected so as to permit its positioning in the yard or on a balcony, as well.

And finally, the device should be relatively inexpensive so as to allow every dog lover to purchase and install it in his house.

SUMMARY OF THE INVENTION

The storing and dispensing device for granular foodstuff comprises essentially a box or bin having a filling opening in its top portion and an opening in its bottom portion which is downwardly continued in the form of a substantially vertical outlet channel. The outlet channel contains the dispensing mechanism which includes an upper valve at the top of the channel and a lower valve at its open bottom end, the two valves being interconnected so as to permit their simultaneous upward and downward movement by manual operation from the outside of the bin. In normal state the upper valve closes the bin and prevents food-stuff from flowing out, while the lower valve keeps the channel end open. For dispensing of foodstuff the mechanism is raised, opening the upper valve and closing the channel by the lower valve, thereby effecting foodstuff to flow out of the bin and to fill the channel. By lowering the mechanism again the bin is closed by the upper valve while the foodstuff flows out into a feeding bowl through the now-open lower valve.

The two valves are preferably interconnected by a vertical axle which is rigidly attached to the lower valve and slidingly connected to the upper valve in such a manner that by raising the axle the lower valve is the first to be lifted and to close the channel opening until an adjustable stop on the axle lifts the upper valve and allows the material to flow into the channel. The stop on the axle is in the form of a nut movable along a screw-threaded portion of the axle, whereby the upper valve is opened at a predesignated distance from the lower valve, thus determining the volume in the channel to be filled.

In a preferred embodiment of the invention the lower bin portion converges towards the channel in funnel-shape, and the upper valve is in the form of a pyramid, both shapes allowing free flow of the material towards the valve opening. The lower valve is preferably in chute-shape, again to permit free outflow of the foodstuff. In order to force the upper valve closed after releasing the axle a spring is preferably mounted on the axle above the upper valve which is compressed during upward movement and urges the valve down upon its seat against the resistance of the foodstuff.

In a storing and dispensing device for dogfood the bin constitutes the upper portion of a rectangular stand the bottom of which forms a feeding bowl. The bin has an open top firmly closed by a lid and the axle is preferably actuated by a handle on the outside of the bin which is connected to the axle top by shaft and lever means.

DETAILED DESCRIPTION OF THE DRAWINGS

Figure 1:
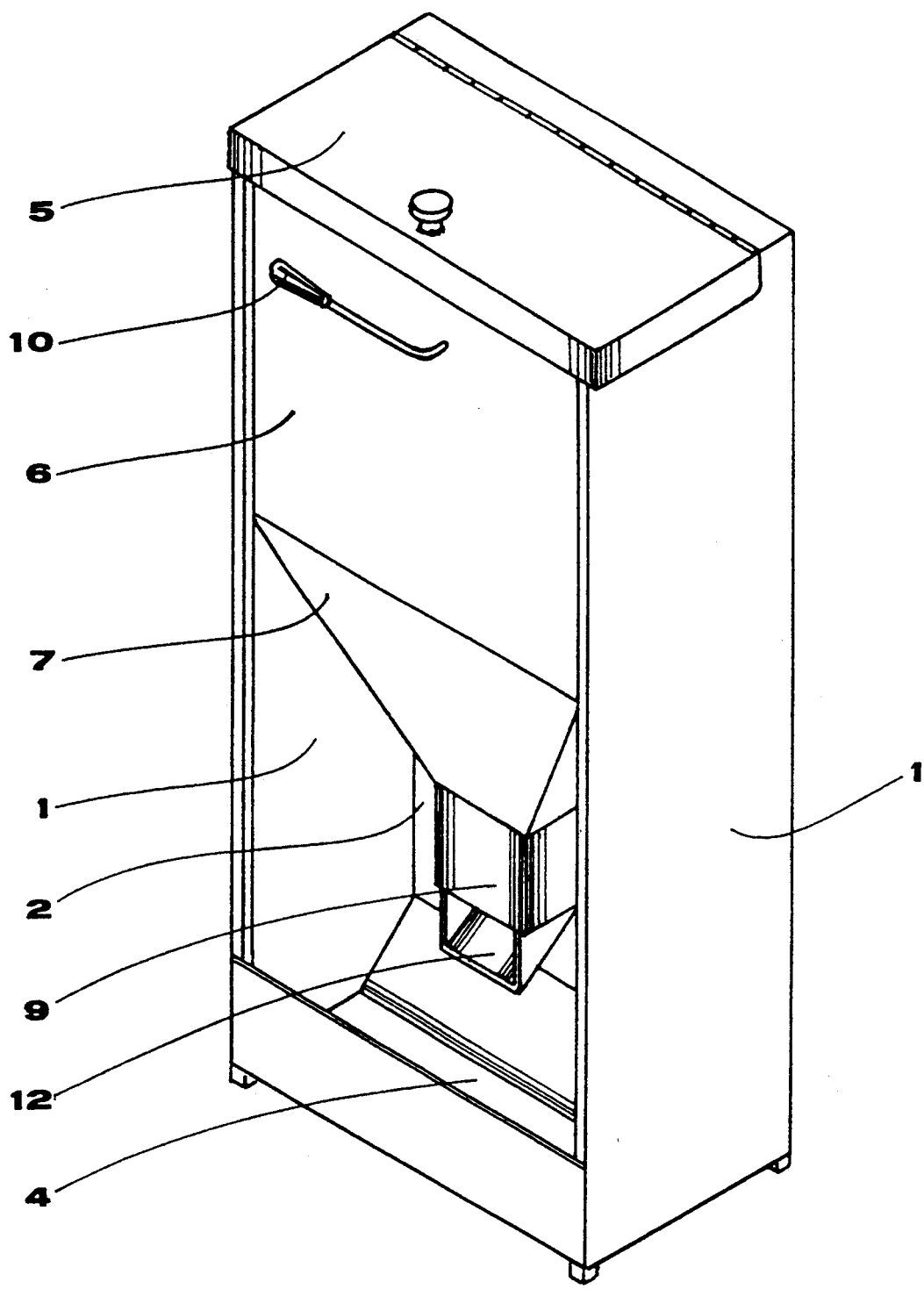
FIG. 1 is an isometric view of an embodiment of the storing and dispensing device.
Figure 2:
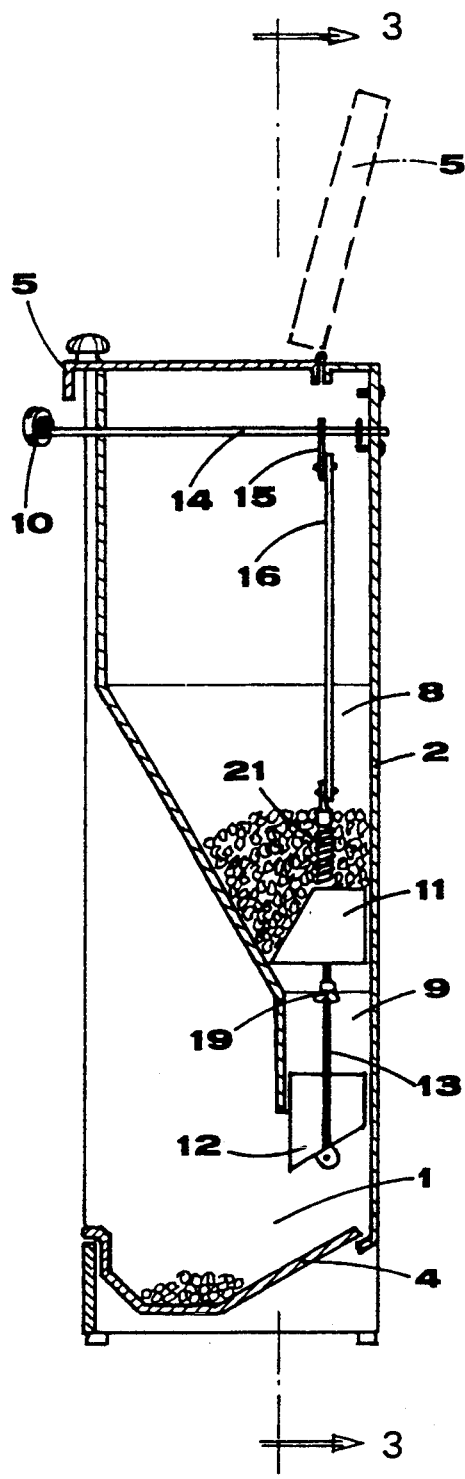
FIG. 2 is a vertical section through the device shown in FIG. 1.
Figure 3:
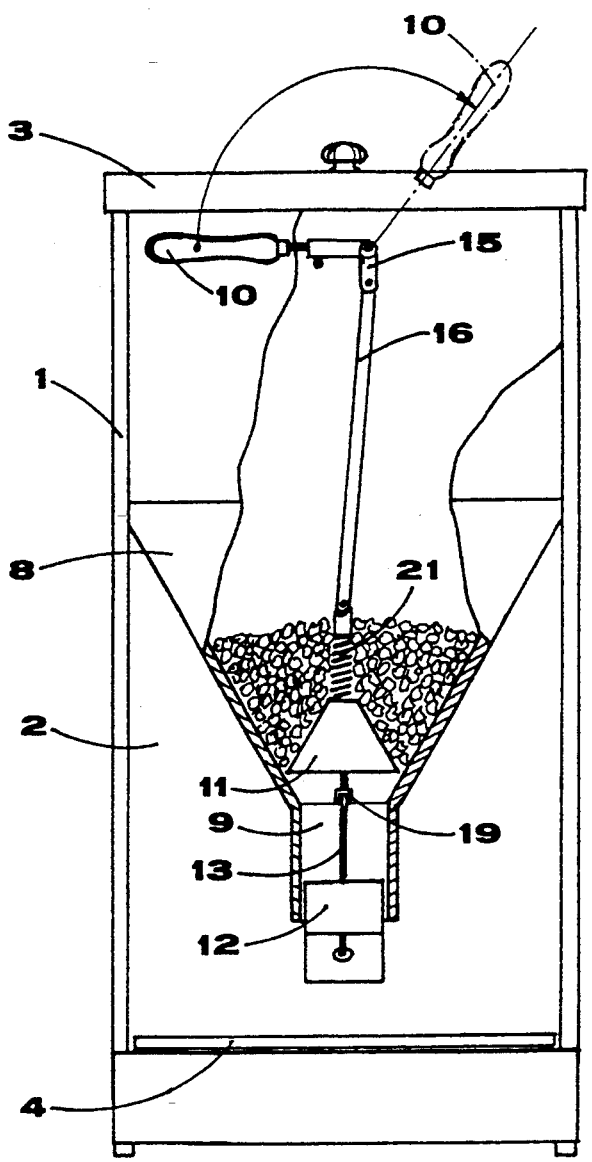
FIG. 3 is a section along line 3—3 of FIG. 2.

The device illustrated in FIGS. 1, 2 and 3, includes a stand having two side walls 1, a rear wall 2, a bottom 4 which is optionally shaped to form a feeding bowl, and a top part forming a box or bin and containing the dispensing mechanism. The bin has a filling opening 3 on top to be firmly closed by a lid 5 and is formed by an upper vertical front wall 6, a lower inwardly inclined front wall 7 and two inclined side walls 8 which are downwardly continued by a vertical channel 9. A handle 10 is mounted on the front wall of the bin serving to operate the dispensing mechanism.

Figures 4, 5:
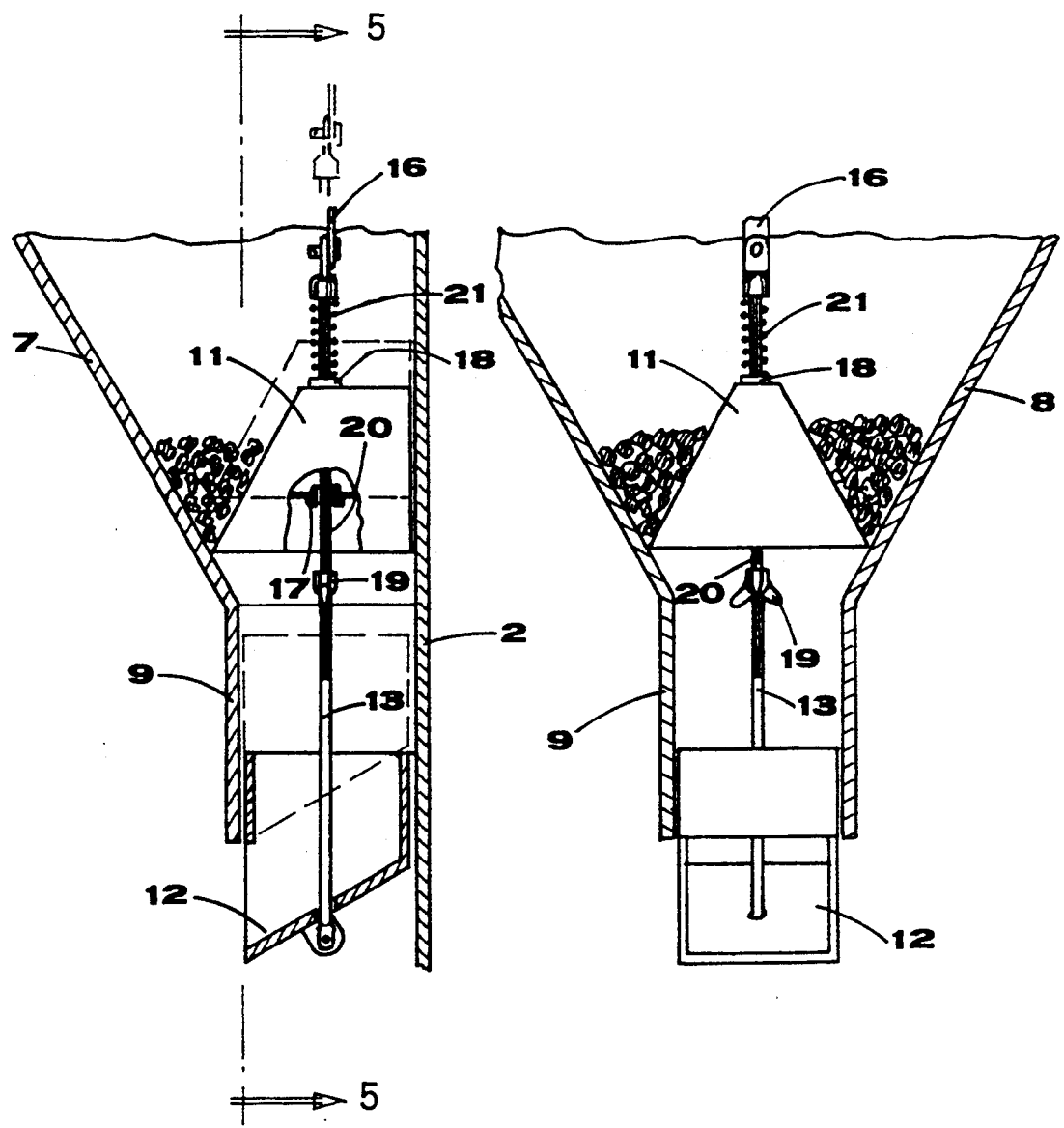
FIG. 4 shows, at a larger scale, a vertical section through the dispensing mechanism of the device shown in FIG. 2.
FIG. 5 is a section along line 5—5 of FIG. 4.

This mechanism comprises an upper valve 11 in the form of a hollow pyramid which, in closed state, is seated on the inclined walls 7 and 8 of the bin, and a lower valve 12 in the form of a chute movable up and down in channel 9. The two valves are interconnected by a vertical axle 13 which is movable in the vertical direction by turning movement of the handle 10 through a horizontal shaft 14, a lever 15 mounted on shaft 14 and a rod 16 pivotally connected to its top. FIGS. 4 and 5 show the mechanism on a larger scale, making it easier understood. The axle 13 is firmly attached to the bottom of the valve 12, lifting it and thereby closing the bottom of the channel 9. The valve 11 is slidingly connected to the axle 13 through two bushes 17 and 18 attached to it at different levels, allowing initial raising of the lower valve 12, until lifting of the upper valve 11 is effected by firm contact between the bush 17 and a winged nut 19, its height being adjustable by rotation on the screw-threaded portion 20 of the axle. A helical spring 21 placed between bush 18 and the top of the axle serves to urge valve 11 down on its seat, after lowering axle 13.

Dispensing of a predesignated amount of dogfood or other foodstuff is effected by turning the handle 10 about a right angle which raises axle 13 and valve 12, thereby closing channel 9. Axle 13 slides up inside bushes 17 and 18 until contact is made by winged nut 19 which lifts valve 11 from its seat and allows granulated food F to pass through the opening between valve and seat and to fill the channel. As soon as handle 10 is turned back and axle 13 is lowered, valve 11 is pressed down on its seat by force of spring 21, channel 9 is opened and the food is emptied into bowl 4. The volume of channel 9 fillable with food is adjustable by means of winged nut 19 in its lowest position on axle 13 valve 11 is opened only after valve 12 has reached a high point in channel 9, thus creating a small volume to be filled and, vice versa, by positioning the nut in its highest position on axle 13 valve 11 opens just after valve 12 has closed channel 9, thus creating a large volume to be filled with food.

Figure 6:
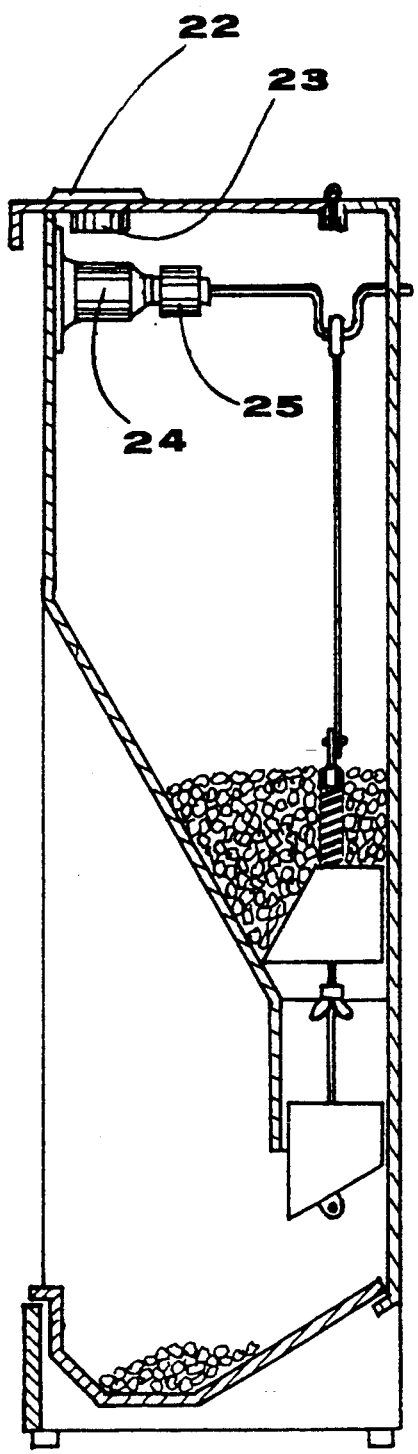
FIG. 6 illustrates a storing and dispensing device operated by an electric motor.

The device illustrated in FIG. 6 is adapted to be automatically operated by an electric motor 24 and a reduction gear 25. The electric motor is adapted to be energized at certain time intervals by an electronic circuit including a timer switch 23 controlled by an electronic control board 22.

It is also proposed to automatically operate the valve mechanism by a solenoid energized by electronic equipment similar to that shown in FIG. 6.

It will be understood that the device shown and described in the foregoing constitutes only one embodiment of the invention and that variations and modifications may be carried out to it by a person skilled in the art, based on the same principle of initially closing the channel by the lower valve and subsequently opening the bin by lifting the upper valve.

It will also be understood that the stand shown in the drawing may be replaced by a device containing the bin and the dispensing mechanism only to be hung on a wall instead of being placed on the floor.

The handle 10 and the shaft and lever mechanism may be replaced by a grip directly connected to the axle 13 and serving to raise the axle and the valves by hand.

Still other modifications may be carried out regarding shape and form, so as to adapt it to the fashion of each period.

I claim:

1. A storing and dispensing device for granular foodstuff, comprising:
   bin means for containing foodstuff, said bin means including a top portion with an opening for filling said bin means with said foodstuff,
   a substantially vertical channel downwardly continued from said opening, said substantially vertical channel having an open bottom which forms an outlet for said foodstuff;
   valve assembly means movable in said bin means and said channel between a bottom position thereof for preventing foodstuff from entering said channel from said bin means, and a top position thereof for permitting foodstuff to enter said channel from said bin means while preventing foodstuff from leaving said channel through said outlet, said valve assembly means including:
   a substantially vertical axle adapted to be forcefully raised from a bottom position thereof to a top position thereof,
   upper valve body means for normally closing an upper end of said channel, said upper valve body means being slidingly mounted on said axle,
   spring means, surrounding said axle, for urging said upper valve body means in a downward direction,
   lower valve body means for maintaining the bottom of said channel in an open state in a bottom position thereof, said lower valve body means being fixedly connected to a lower portion of said axle and having a shape of a chute closely fitting into said channel and coaxially movable in said channel,
   stop means, height-adjustably positioned on said axle between said upper valve body means and said lower valve body means, for adjusting the quantity of foodstuff to be dispensed at every operation of said valve assembly means; and
   a valve operating mechanism including manually operated means for:
   raising said axle into the top position thereof so as to open said upper valve body means upon contact with said stop means and thereby let foodstuff flow from said bin means into said channel and so as to close said channel bottom by raising said lower valve body means into said channel, and
   lowering said axle into the bottom position thereof so as to close said channel by said upper valve body means and effect release of a predesignated quantity of foodstuff from said channel through an opening in said lower valve body means.

2. The storing and dispensing device of claim 1, wherein said bin means includes a lower portion interposed between said top portion and said channel, said lower portion having a chute-shape of a rectangular cross section and having a bottom end thereof connected to the upper end of said channel, and said channel having a rectangular cross section.

3. The storing and dispensing device of claim 2, wherein said upper valve body means has a pyramidal shape with lower edges thereof resting, in a closed position, on walls of said chute-shaped lower portion of said bin means.

4. The storing and dispensing device of claim 2, wherein said lower valve body means is in the shape of a chute sealingly fitting into said rectangular channel, effecting closing of said channel in a raised position thereof and permitting foodstuff to flow out of said channel in the bottom position thereof.

5. The storing and dispensing device of claim 1, wherein said manually operated means includes:
   lever means for raising and lowering said vertical axle, and handle means, positioned on an outside portion of said bin means, for actuating said lever means.

6. The storing and dispensing device of claim 1, wherein said stop means includes nut means, movable on a screw-threaded portion of said axle, for changing the distance between said two valve body means and thereby changing the amount of foodstuff flowing from said bin means into said channel each time said valve body means are raised.

7. The storing and dispensing device of claim 1, wherein said bin means is incorporated in a rectangular stand having a bottom serving as a feeding bowl.

8. The storing and dispensing device of claim 1, wherein said granular foodstuff is dogfood.

9. The storing and dispensing device of claim 1, wherein said spring means includes a helical spring surrounding said axle.

10. A storing and dispensing device for granular foodstuff, comprising:
   bin means for containing foodstuff, said bin means including a top portion with an opening for filling said bin means with said foodstuff,
   a substantially vertical channel downwardly continued from said opening, said substantially vertical channel having an open bottom which forms an outlet for said foodstuff;
   valve assembly means movable in said bin means and said channel between a bottom position thereof for preventing foodstuff from entering said channel from said bin means, and a top position thereof for permitting foodstuff to enter said channel from said bin means while preventing foodstuff from leaving said channel through said outlet, said valve assembly means including:
      a substantially vertical axle adapted to be forcefully raised from a bottom position thereof to a top position thereof,
      upper valve body means for normally closing an upper end of said channel, said upper valve body means being slidingly mounted on said axle,
      spring means, surrounding said axle, for urging said upper valve body means in a downward direction,
      lower valve body means for maintaining the bottom of said channel in an open state in a bottom position thereof, said lower valve body means being fixedly connected to a lower portion of said axle and having a shape of a chute closely fitting into said channel and coaxially movable in said channel,
      stop means, height-adjustably positioned on said axle between said upper valve body means and said lower valve body means, for adjusting the quantity of foodstuff to be dispensed at every operation of said valve assembly means; and
   a valve operating mechanism including electrically operated means for:
      raising said axle into the top position thereof so as to open said upper valve body means upon contact with said stop means and thereby let foodstuff flow from said bin means into said channel and so as to close said channel bottom by raising said lower valve body means into said channel, and
      lowering said axle into the bottom position thereof so as to close said channel by said upper valve body means and effect release of a predesignated quantity of foodstuff from said channel through an opening in said lower valve body means.

11. The storing and dispensing device of claim 10, wherein said granular foodstuff is dogfood.

12. The storing and dispensing device of claim 10, wherein said spring means includes a helical spring surrounding said axle.

* * * * *